(12) United States Patent
Calder

(10) Patent No.: US 6,737,966 B1
(45) Date of Patent: May 18, 2004

(54) KEYPAD ANNUNCIATOR GRAPHICAL USER INTERFACE

(75) Inventor: Dale E. Calder, Mansfield, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/351,058

(22) Filed: Jul. 12, 1999

Related U.S. Application Data

(62) Division of application No. 08/665,211, filed on Jun. 14, 1996, now Pat. No. 5,984,502.

(51) Int. Cl.7 .............................................. G08B 29/00
(52) U.S. Cl. ...................... 340/506; 340/502; 340/503; 340/507; 340/525; 700/17; 700/83
(58) Field of Search .................................. 340/506, 502, 340/503, 504, 505, 507, 525, 531, 7.22; 700/17, 27, 21, 79, 82, 83, 84, 80

(56) References Cited

U.S. PATENT DOCUMENTS

| | | | | |
|---|---|---|---|---|
| 4,065,643 A | * | 12/1977 | Girod | 379/22 |
| 4,304,001 A | | 12/1981 | Cope | 714/4 |
| 4,413,314 A | | 11/1983 | Slater et al. | 700/83 |
| 4,639,881 A | | 1/1987 | Zingher | 345/839 |
| 4,644,478 A | | 2/1987 | Stephens et al. | 702/188 |
| 4,860,292 A | * | 8/1989 | Newman et al. | 714/748 |
| 5,128,666 A | * | 7/1992 | Munier et al. | 340/3.1 |
| 5,247,434 A | | 9/1993 | Peterson et al. | 700/83 |
| 5,331,549 A | | 7/1994 | Crawford, Jr. | 600/513 |
| 5,353,238 A | | 10/1994 | Neef et al. | 702/184 |
| 5,353,316 A | | 10/1994 | Scarola et al. | 376/259 |
| 5,408,603 A | | 4/1995 | Van de Lavoir et al. | 345/763 |
| 5,428,555 A | * | 6/1995 | Starkey et al. | 700/275 |
| 5,631,825 A | | 5/1997 | van Weele et al. | 700/83 |
| 5,984,502 A | | 11/1999 | Calder | 700/83 |
| 6,144,884 A | * | 11/2000 | Niemeyer et al. | 700/3 |

FOREIGN PATENT DOCUMENTS

| | | |
|---|---|---|
| DE | 39 30 581 | 3/1991 |
| EP | 0528396 | 2/1993 |
| EP | 0 621 522 A2 | 10/1994 |
| EP | 0310233 | 2/1995 |
| EP | 0389132 | 10/1995 |
| JP | 62017805 | 1/1987 |
| WO | WO 93 24870 | 12/1993 |
| WO | WO 9607958 | 3/1996 |

OTHER PUBLICATIONS

Towsley Don; "Error Detection and Retransmission Schemes in Computer Communication Networks", Proceedings of Computer Communication Networks: Interfaces & Interactions, 17:12–18, (Sep. 5–8, 1978).

"Alarm Bells Ring for the Annunciator Panel," *Engineering Materials and Design*, vol. 30, No. 11: pp. 31, 33 (Nov. 1986).

Powers, Joseph "Integrate Major Benefits of Distributed and Central Modes In Process Control System," *Chemical Processing*, vol. 45, No. 9, pp. 122–123 (1982).

* cited by examiner

*Primary Examiner*—Toan Pham
(74) *Attorney, Agent, or Firm*—Kevin A. Oliver; Foley Hoag LLP

(57) ABSTRACT

A Keypad Annunciator Graphical User Interface, (KAGUI), for use by an operator of a process control system for presenting and responding to alarm state data generated by the process control system, is disclosed. The KAGUI provides an interactive display of a keypad annunciator on a monitor display screen. A panel manager display and a dynamic icon enhance operator awareness, in a multi-window display environment, of alarms. The KAGUI synchronizes alarm data presented by the KAGUI with process control system alarm data and informs the operator of the status of interprocess communication.

19 Claims, 10 Drawing Sheets

KEYPAD ANNUNCIATOR GRAPHICAL USER INTERFACE

This application is a division of U.S. application Ser. No. 08/665,211 filed Jun. 14, 1996, now U.S. Pat. No. 5,984,502.

FIELD OF THE INVENTION

The present invention relates to devices for monitoring and controlling industrial processes, and more particularly, to a keypad annunciator graphical user interface for presenting process control system alarm data, and for providing a flexible and intuitive means by which an operator may acknowledge alarms and take corrective action.

BACKGROUND

Modern industrial processes are becoming increasingly automated and complex. Such processes, whether involving the smelting of steel or the generation of nuclear power, are typically overseen from a centralized location by a process engineer or operator, who monitors data from hundreds, or even thousands, of sensors distributed throughout a facility. Sensors measuring voltage, current, power consumption, magnetic or electric field strength, temperature, pressure, humidity—the list is virtually endless—can be part of a modern process control system. Sensor data is used to evaluate the suitability of raw materials, provide feedback data during processing and manufacture, control valves and process flows, ensure the quality of manufactured products, and generate alarms. In particular, sensors can be used to gather data indicative of an alarm state in an process control system.

When an alarm occurs, considerable demands are placed on the process operator, who, confronted with a vast array of data from a vast array of sensors, must respond quickly and effectively to ensure safe and economical operation of the facility. Optimally, when an alarm occurs the operator is immediately alerted. Next, the operator ascertains the location, purpose and significance of the sensor. Typically, there are thousands of pages of documentation describing the operation of the industrial process in question and describing the purpose and significance of the various sensors. After locating and consulting the appropriate portions of the documentation, and perhaps viewing data from other sensors, the operator institutes proper corrective action. The actual scenario, however, is not always optimal, and the operator's job is at times difficult.

In an earlier era, of simpler, less automated industrial processes, an annunciator wall panel often informed operators of alarms. Individual sensors were essentially hard wired, via relays or other simple circuitry, to individual lamps placed at appropriate locations on a wall-sized schematic of the process. Sensor data out of an acceptable range illuminated a light and sounded a horn. However, technological advances, particularly the advent of computers, have greatly increased the complexity of most industrial processes, as well as increased the burden on the operator charged with oversight of the process. In many cases, the old annunciator panel wall is obsolete and relatively inflexible.

Technological advance has also improved the tools used by the process operator. Video displays run application programs that can, for example, graph process data, display a process graphic (a schematic representation of a portion or of all of an industrial process) or perform a keyword search through documentation. However, not all the tools are significantly improved: the hardware annunciator keyboard (HAK) remains. The HAK is composed of a numeric keypad with adjacent rows of illuminable lights, and can be described as essentially a shrunken version of the annunciator wall panel. An occurrence of a sensor alarm causes a horn to sound and illuminates a key associated with that alarm. The operator acknowledges the alarm and silences the horn by pressing the illuminated key.

The present HAK does not optimally address the needs of an operator charged with overseeing a modem and highly automated modern industrial process. The existing HAK is bulky, costly to produce, difficult to reconfigure, and limited to a number of standard key formats. The HAK warns an operator of all alarms, regardless of severity, in the same manner—the same horn sounds, and one of several keys, all typically of the same color, illuminates. Adding alarm states to a process control system can require multiple hardware annunciator keyboards, as keys are not easily added to an existing keyboard, further adding to system costs.

Accordingly, a need exists for a more economical and versatile alarm interface that relatively quickly and effectively communicates alarm states, facilitates timely and proper corrective action, and complements the graphical tools for video display already at the operator's disposal.

It is an object of the invention to provide a more versatile keypad annunciator that allows an operator to manage more effectively and efficiently a modem complex industrial process control system.

It is a another object of the present invention to provide a keypad annunciator that more effectively presents alarm data.

It is a further object of the present invention to reduce the cost of producing a keypad annunciator.

An additional object of the invention is to provide an operator-configurable keypad annunciator that an operator may readily configure to better ensure acknowledgment and appropriate operator response to the occurrence of an alarm state.

SUMMARY OF THE INVENTION

The invention achieves the foregoing and other objects by providing a keypad annunciator graphical user interface for displaying an interactive keypad annunciator on a monitor display screen. The keypad annunciator display is interactive, i.e., a user may enter commands and otherwise direct the process control system by selecting elements of the keypad display, such as a key, with a pointing and selecting input device, such as a mouse. The keypad annunciator graphical user interface, or KAGUI, is also readily configurable by a user such that presentation of alarm data and of actions initiated by selection of the key may be tailored to better manage the process control system. The KAGUI complements other window-based tools at the operator's disposal, allowing use of other windows, yet providing an enhanced ability to alert an operator of an occurrence of an alarm state. The term "alarm state," as used herein, refers to a state of the process control system determined as a function of system inputs that include sensor data. A normal alarm state is one in which no alarms are occurring (i.e., sensor data and other inputs indicate that the process is operating in a normal or acceptable manner). In comparison, when there is a potential problem with the process, an alarm is generated in order to quickly notify the operator, and a particular alarm state is said to have occurred.

According to one aspect of the present invention, a key of the KAGUI is associated with an alarm state or states of the process control system such that occurrence of the alarm state causes the key to change its appearance. Typically, the key changes color and blinks. The invention also provides for a system wherein the operator chooses a particular key to associate with a particular alarm state and defines the alarm states.

Further aspects of the invention provide for user interaction. In particular, the system provides an input element that is selectable and acknowledges a key in an alarm state by selecting the key with a pointing device. Selection of a key typically silences the horn and displays a process graphic, i.e., a schematic representation of the area of the facility where the alarm is occurring. Such a process graphic can include summary data on the sensor or sensors generating the alarm.

The KAGUI is not likely to be the only application using the display monitor of a process control system, and at times other windows and GUIs are likely to obscure the KAGUI. These other windows and GUIs can create confusion—a user can open several windows simultaneously, perhaps temporarily losing track of other important windows. Alarm data are too important to be ignored, however, even temporarily. Accordingly, to provide the advantages of a KAGUI operating in a modem application environment, yet ensure proper presentation of alarm data, the invention incorporates several features.

According to one feature of the present invention, occurrence of an alarm state associated with a key of a particular keypad automatically causes that keypad to appear as the topmost window in the display.

According to another feature of the present invention, a user may choose an option whereby a keypad annunciator floats on top of the display as a high priority window, i.e., a window with a priority higher than a majority of other windows.

According to yet another feature, the invention provides a dynamic icon, representing a minimized keypad annunciator, that changes appearance to indicate occurrence of any alarm state associated with selected keys. The icon normally appears in a static state; however, upon occurrence of an alarm state associated with the selected keys, the icon appears in a dynamic state, exhibiting a selected motion. The icon can also simply change from one static display state, indicating no alarms, to a second static display state, indicating an alarm. The icon may be configured to appear on the display upon the occurrence of an alarm state, or to float on the display as a high priority icon.

According to yet a further feature of the present invention, the KAGUI incorporates an interactive compact visual representation of alarm data. This compact visual representation or display of alarm state information is referred to herein as a panel manager. The panel manager is typically larger than an icon but smaller than a full keypad annunciator display.

In one aspect of the present invention, the panel manager comprises unique graphical elements, such as buttons, that are each associated with a keyboard annunciator. The graphical element changes visual appearance, e.g., changes color and/or blinks, upon occurrence of an alarm state associated with a selected key or keys of the particular keypad annunciator represented by the button. Selection of the button with a pointing device, such as a pen or mouse, causes the appropriate keypad annunciator to appear on the display. As usual, the alarm state occurrences are accompanied by the sounding of a horn or generation of whatever audible stimulus is associated with that alarm state by the operator.

In another aspect of the present invention, the buttons of a panel manager employ a selectable third visual state to indicate existence of an alarm state that has been acknowledged by an operator.

In a further aspect of the present invention, the panel manager comes to the front as a topmost window upon the occurrence of an alarm state associated with a key on a keypad of which the panel manager is a compact visual representation. The panel manager may also simply be made a display with a higher priority than most other windows of the display. Because of its compact size, placing the panel manager at the forefront of the display does not unduly interfere with the operator's working with other windows.

The foregoing aspect of the invention regarding presentation of alarm states, particularly the dynamic icon and the panel manager, allows an operator to fully employ a multi-window, multi-application control workstation yet be highly assured of timely and effective communication of the occurrence of an alarm state.

The keyboard annunciator graphical user interface communicates to an operator the alarm status of a process control system. A typical industrial process control system is highly distributed and typically uses computer processors of different manufacture, often running different operating systems, located at a distance from each other. Communication between computers is often over a network. Interprocess communication (IPC) is therefore the lifeblood of the modem and highly automated process control system. Sensors can communicate with processors, processors can communicate with each other, and many of the foregoing can communicate with the control workstation. Network communication, however, is not always reliable, and alarm data transmission to the KAGUI can be interrupted. Nevertheless, the KAGUI should accurately represent at all times the alarm state of the process control system.

In a healthy industrial process, alarm states do not regularly occur and the communication means for transmitting alarm data are not constantly in use and thus are not constantly tested. Accordingly, the invention provides apparatus and methods to maximize probability that the alarm state of the process control system represented by the keyboard annunciator graphical user interface is correct.

According to one feature of the present invention, "verification" messages are constantly transmitted over a communication path to verify its continued existence. Acknowledgment signals are sent by a receiver of an IPC message to the sender. Under normal conditions, that is, when the communication path is functional properly and open, constantly sending verification signals results in constantly receiving acknowledgment signals, which confirm the continued existence of the path. The process operator is typically informed of the status of the communication path by a display element of the KAGUI. The display element typically has two visual states, one to indicate successful transmission of verification signals and another to indicate unsuccessful transmission of verification signals, and hence a break in the communication channel. Note that the content of the verification message is typically irrelevant. It is the sending of the messages on a regular basis that serves to verify the continued existence of the IPC path.

According to another aspect of the present invention, means are provided, such as a selectable button on a toolbar, for an operator to resynchronize the alarm state information possessed and displayed by a keyboard annunciator graphical user interface with that of the process control system. Resynchronization refers to a download of alarm state information from a process control system to a KAGUI to refresh the data presented by the KAGUI so that the KAGUI represents, as accurately as possible, the alarm state of the process control system.

In yet a further aspect of the present invention, the KAGUI automatically maintains synchronization of alarm data by, upon detecting a failed transmission "verification signal," reestablishing the communication path, such as a pipe, between the KAGUI and the process control system and retransmitting all alarm state information from the process control system to the KAGUI.

In an additional aspect of the present invention, a server process is established to route alarm state data from a state table maintained by a process control system to a client process operative with the KAGUI. Such a server process can serve multiple clients.

The KAGUI can be configured in many ways to enhance presentation of, and response to, alarm state information. Configuration options useful to an operator are therefore briefly outlined.

According to another aspect of the present invention, the KAGUI appears on a monitor as a traditional hardware keyboard annunciator. A numeric keypad is situated adjacent rows of alarm keys.

In an additional aspect of the present invention, the layout of the keys, that is, the number of rows and columns, as well as the overall number of keys of the keypad annunciator are selectable. Multiple keypad annunciators are also possible. Multiple lines of label information are displayable on the surface of each of the keys of the keypad annunciator. Furthermore, the visual appearance of a key for indicating non-occurrence of a alarm state, occurrence of an alarm state, and an acknowledged alarm are selectable. Typically, a key not in alarm appears as a first solid color; a key in alarm appears as a second color and blinking; and a key indicating an acknowledged alarm appears in the second color but does not blink.

An audible stimulus typically alerts the operator to a key in an alarm state. However, all alarm states are not created equal; some may involve potential injury to personnel while others may indicate a simple and relatively easily correctable "glitch" in the industrial process. Accordingly, the invention allows an operator to select a unique sound to indicate priority of an alarm.

BRIEF DESCRIPTION OF THE DRAWINGS

For a fuller understanding of the nature and objects of the invention, reference is made to the following detailed description and the accompanying drawings, in which.

DETAILED DESCRIPTION

Figure 1:
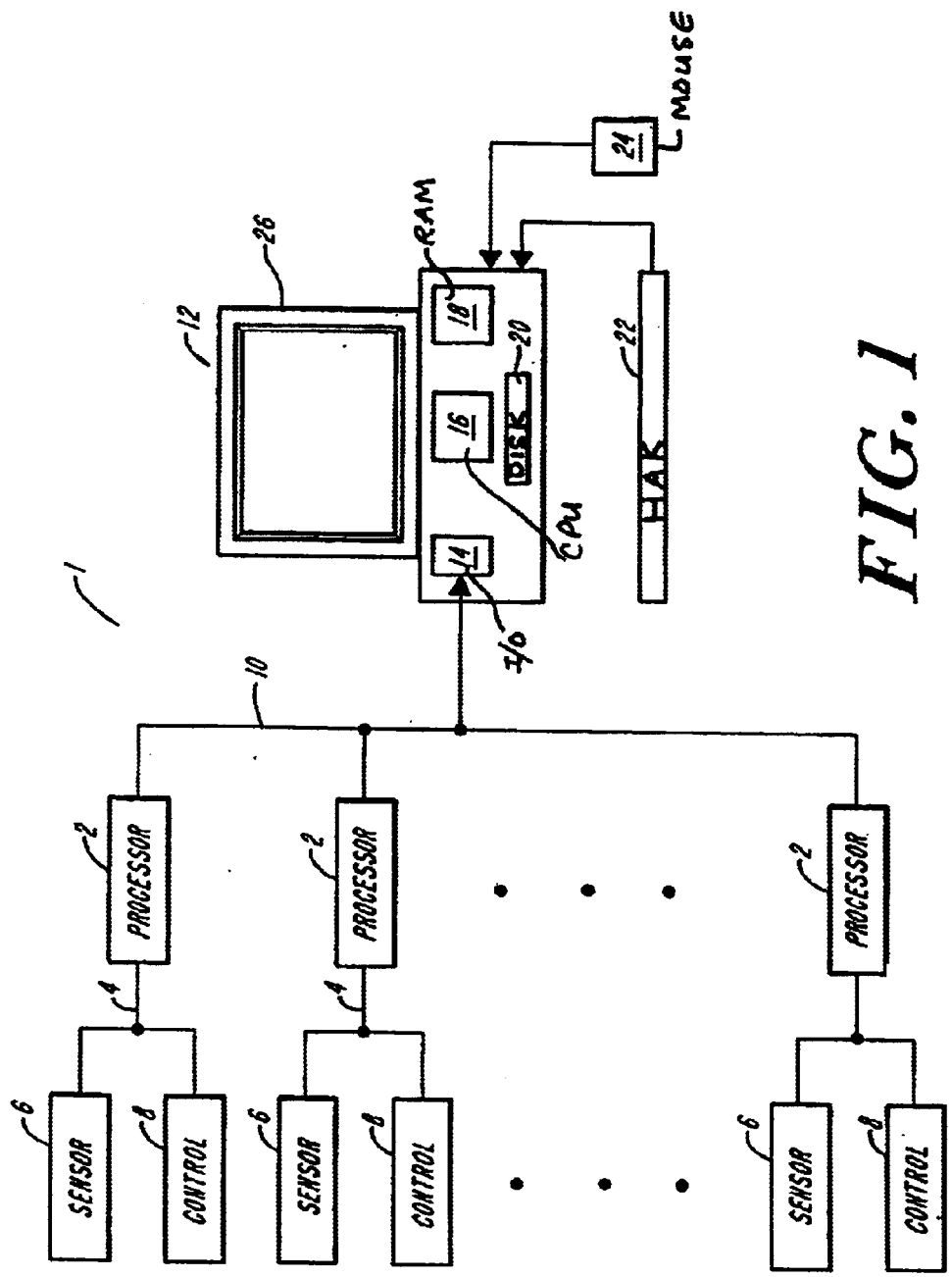
FIG. 1 is a schematic illustration of a typical process control system.

FIG. 1 schematically illustrates the major components of a modern process control system 1. Processors, such as processor 2, are typically located throughout an industrial facility and serve to process data from sensors, such as sensor 6, and to operate controls, such as control 8. Sensor 6 provides feedback to processor 2 such that programs or algorithms running on the processor 2 can properly operate control 8. For example, sensor 2 could be a temperature sensor for measuring the temperature of a process flow and control 6 could be a valve for controlling the flow. Processor 2 also calculates alarm states based on data from sensor 6, and perhaps from other sensors as well.

Processor 2 can be a complete computer, including a central processing unit, random access memory, read only memory, a hard drive and input-output hardware. A monitor is usually not part of processor 2, nor is a keyboard typically attached. Several different processors may be part of the overall process control system 1, and different operating systems such as UNIX, SUN OS or Windows NT, running on different machines, can be part of an overall process control system. Processor 2 communicates with sensor 6 and with control 8, and with the central control and monitoring workstation 12, over interprocess communication (IPC) paths 4 and 10.

An operator uses workstation 12 to monitor and control the industrial process. Workstation 12 typically comprises input-output hardware 14, a central processor 16, random access memory 18, disk storage 20, a hardware annunciator keyboard (HAK) 22, pointing device, such as mouse 24 and a display monitor 26. A regular keyboard (not shown) for the entry of text is typically also included. The invention replaces HAK 22 with a keypad annunciator graphical user interface (KAGUI). The KAGUI is displayed on video screen 26.

In a simple process control system, individual processors, such as processor 2, are not used, and workstation 12 operates controls, such as control 8, communicates with sensors, such as sensor 6, and runs the computational tasks associated with the process control system 1, including the KAGUI.

Figure 2:
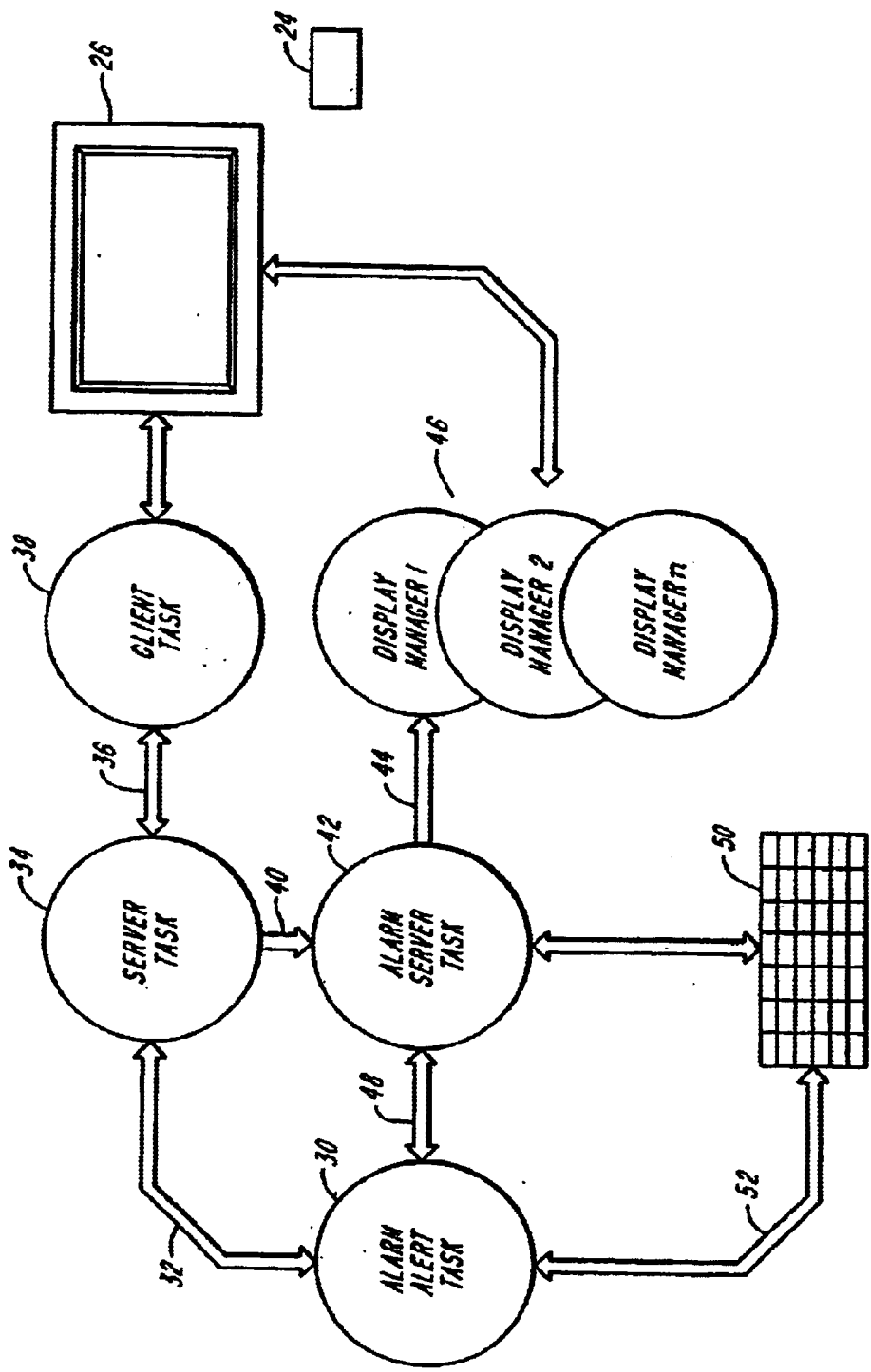
FIG. 2 illustrates selected software and hardware components of process control system including a keypad annunciator graphical user interface.

FIG. 2 illustrates several software components important to the invention. Alarm alert task 30, alarm server task 42, and display managers 46 are part of a typical process control system. Server task 34 and client task 38 work closely with the KAGUI. Communication between tasks, and between tasks and hardware components such as hardware annunciator keyboard 50 and workstation monitor 26, is accomplished via IPC mechanisms. For example, alarm alert task 30 communicates with the server task 34 using IPC path 32. Interprocess communication is important to the present invention and to a process control system, and techniques regarding IPC are subsequently discussed. Display managers 46 display various process graphics and other information on monitor 26. The KAGUI may call these various process graphics and system information to be displayed on the monitor 26. Pointing device 24, such as a mouse, is used to select keys in the KAGUI or other graphical elements of the KAGUI, and to otherwise provide input to the process control system.

Alarm alert task 30 maintains a state table of all alarm information generated by the process control system. Alarm server task 42 processes commands to be executed by the process control system. Some of these commands originate with the KAGUI, others originate from process control interactive displays that appear on display monitor 26. Alarm alert task 30 communicates over IPC path 32 to inform server task 34 whenever a change occurs in the alarm state of the process control system (e.g., a sensor indicates an alarm, or a sensor in alarm returns to normal) The server then communicates this change to the client task 38, and the presentation of alarm data by the KAGUI is updated.

Occurrence of an alarm is generally accompanied by the sounding of a horn, or the generation of whatever audible stimulus the user has selected for that alarm. Hardware annunciator keyboard 50 is included in FIG. 2 to illustrate that, if desired, it can be used in addition to the KAGUI.

A graphical user interface (GUI) is a powerful, interactive display format that enables a user to operate a computer by pointing to and selecting pictorial representations on a screen. The modern GUI is a considerable improvement over the text-based entry operating systems of just a few years ago, which required a user to remember several cryptic commands just to make a computer perform a simple task. A typical process control system has its own GUI that displays, for example, process graphics. The KAGUI of the present invention can be implemented by providing keypad annunciator functionality through the GUI interface of the process control system.

Figure 3:
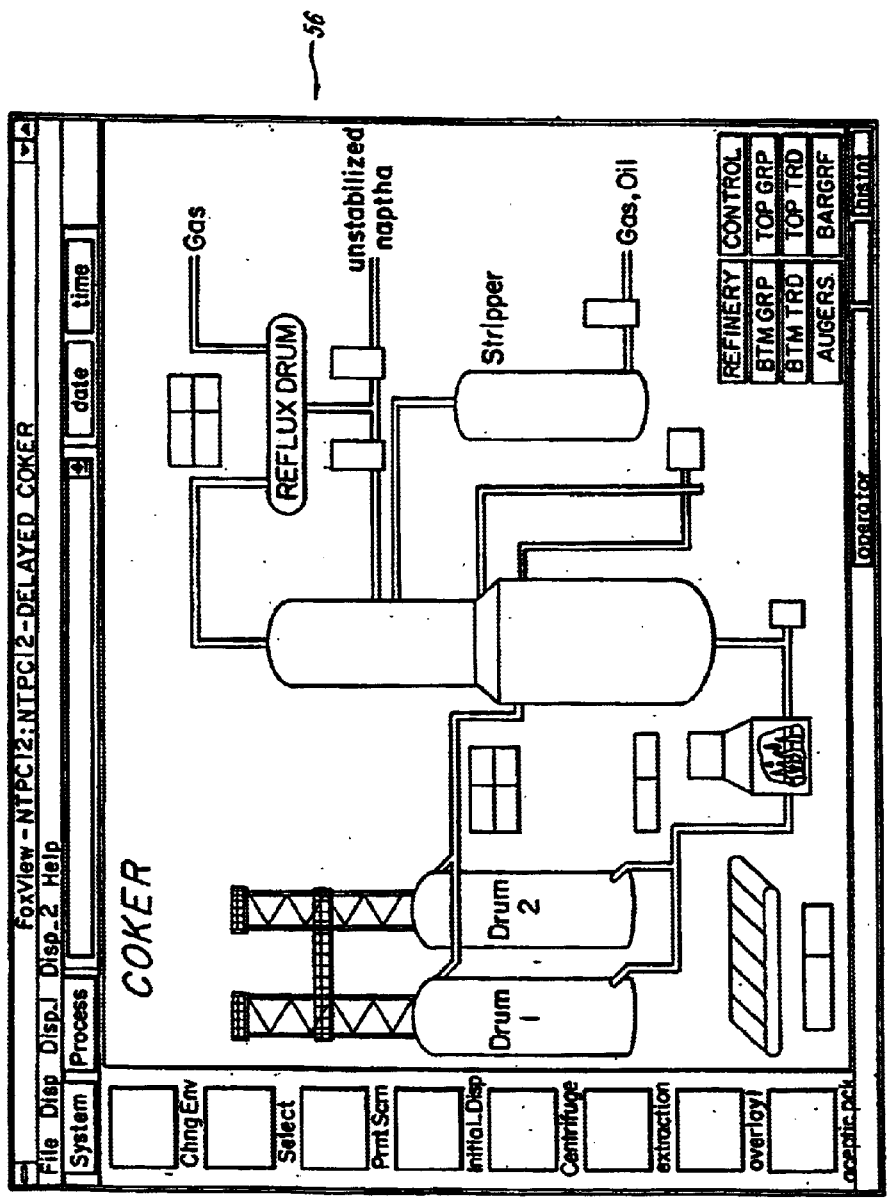
FIG. 3 is a typical process graphic, displayable on a workstation monitor, of a process of a process control system.
Figure 4:
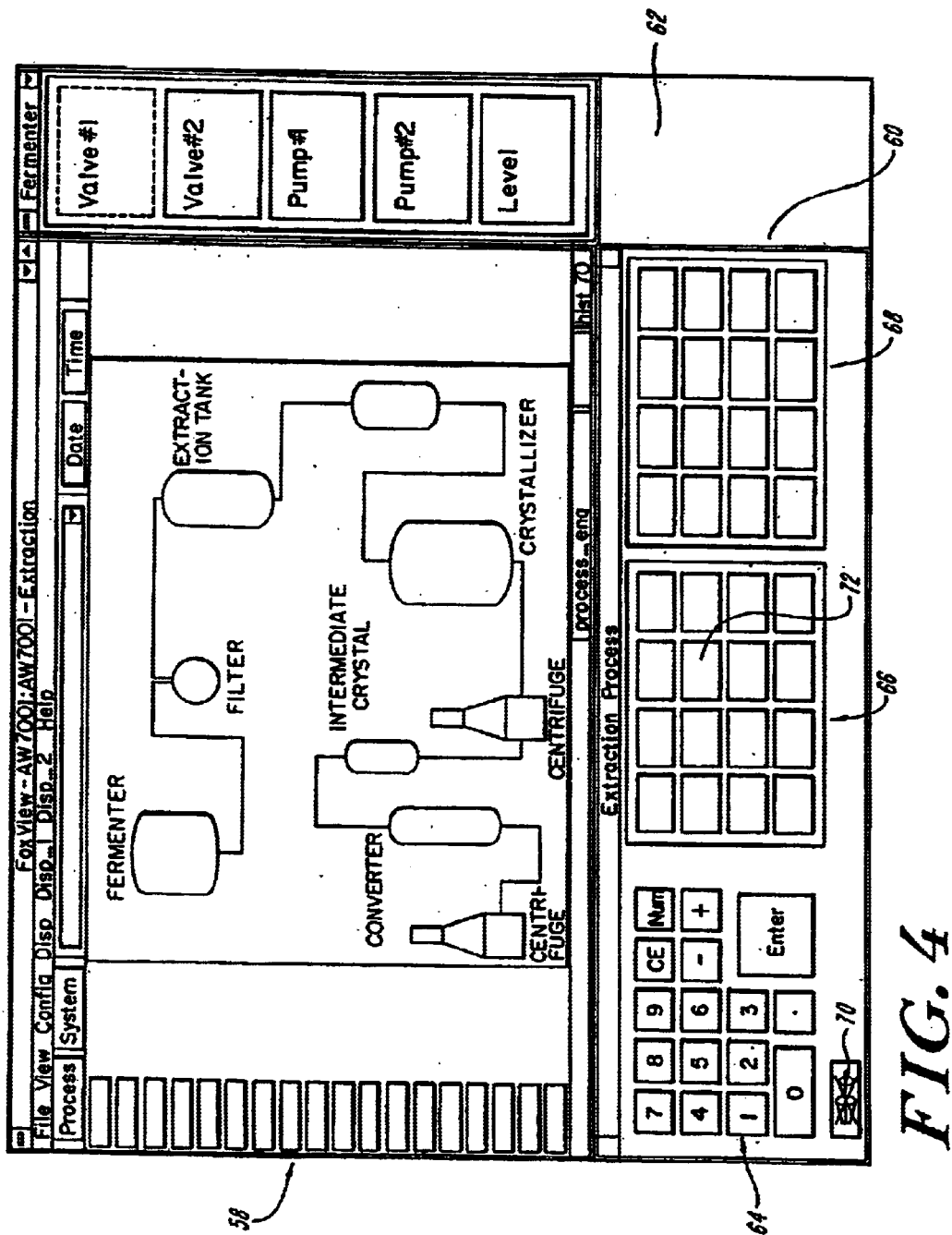
FIG. 4 illustrates a keypad annunciator graphical user interface and a process graphic displayed alongside each other on a workstation monitor display.

FIG. 3 illustrates a typical process graphic 56, displayed on monitor 26, of a process for manufacturing coke. FIG. 4 illustrates the KAGUI implementation of a traditional hardware annunciator keyboard (HAK) 60 displayed with a processing control system process graphic 58. Process graphic 58 appears in the upper portion of FIG. 4. The KAGUI implementation of the hardware annunciator keyboard 60 appears in the lower portion of FIG. 4. The KAGUI implementation of the hardware annunciator keyboard 60, referred to herein as a "soft HAK", is composed of a numeric entry keypad 64 and two alarm button panels 66 and 68, respectively. Also included is button 70, for silencing an alarm horn. Panels 66 and 68 are composed of individual keys. There are sixteen keys per panel arranged in four columns and four rows of keys per panel. In the soft HAK illustrated in FIG. 4, not all the keys are associated with an alarm state. Each key associated with an alarm state, however, has a label displayed on the key, such as on key 72. A pointing device, such as a mouse, is used by the operator to select keys. Operator input via a light pen, or a touch screen, is also well-known in the art.

Figure 5A:
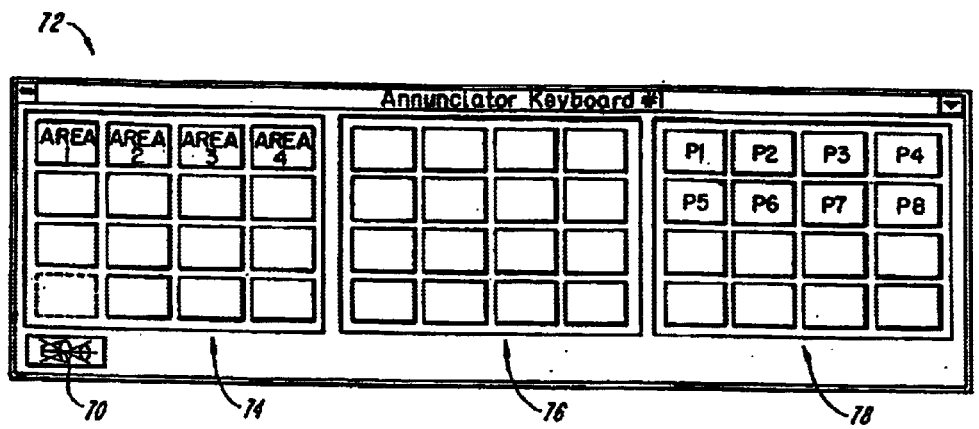
FIGS. 5A and 5B illustrate user-configured keypad annunciators of a keypad annunciator graphical user interface.
Figure 5B:
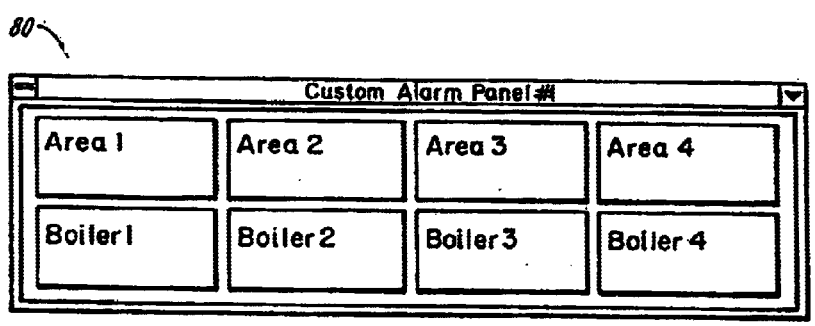

The KAGUI of the present invention allows an operator to readily configure the layout of a keypad annunciator. The operator may customize the keypad annunciator to better present alarm data or to better allow control of the process control system. FIG. 5 illustrates two examples of customized keypad annunciators. In FIG. 5A, keypad annunciator 72 has three panels of keys (panels 74, 76 and 78). The operator has chosen to eliminate the numerical keypad 70 of the soft HAK illustrated in FIG. 4. The use of three panels of alarm keys accommodates additional alarm states. FIG. 5B illustrates another customized keypad annunciator. In keypad annunciator 80, there is only one panel of eight keys. The silence horn button 70, included in keypad annunciators 72 and 60, is not included in keypad annunciator 80. The KAGUI does not limit the operator to one keypad annunciator only; the operator can configure the KAGUI to support multiple keypad annunciators. Keypad annunciator 72 of FIG. 5A and keypad annunciator 80 of FIG. 5B are both readily incorporated by the KAGUI. This is an advantage of the invention over the prior HAK; incorporation of another keyboard would have required another physical bulky HAK.

Other operator-configurable KAGUI keypads include: a keypad annunciator with 48 buttons arranged in twelve columns and four rows; a keypad annunciator including a numeric keypad, and with thirty-two alarm keys arranged in eight columns and four rows; a keypad annunciator with forty-eight keys arranged in six columns and eight rows; and a keypad annunciator with one to three panels of keys and with up to sixteen keys on each panel.

Based on the disclosures herein, one of ordinary skill in the art can design a configurator appropriate for configuring the KAGUI. Such a configurator can be predominantly "hard-coded, " such that most display and other options are fixed, or can provide configuration options that an operator can readily select using, for example, dialog boxes.

Typically, the appearance of a key for indicating no alarm, the occurrence of an alarm and an acknowledged alarm can be configured. Typically a key not indicating an alarm appears in a solid color; a key indicating an alarm appears both in a second color and blinking; and a key indicating an alarm that has been acknowledged by the operator appears in the second color and not blinking. The operator may choose the colors he or she desires for each key and each state. Also configurable are: The alarm state or states of the process control system to associate with each key; an audible stimulus to be generated when a key is in alarm; actions to be initiated by selecting a key, including, for example, running a program, displaying a process graphic or silencing the audible stimulus; and other display options for the KAGUI, including display of panel manager and dynamic icon, both to be subsequently discussed. Advanced configuration options are also provided, such as a drag-and-drop key configuration and auto block extract from existing display files. The operator selects a preconfigured display file using the file manager and drops the file onto the desired keypad annunciator key. The key is assigned to the display file and all the blocks used in the display are automatically included in the block list for that key. Additionally, the configurator exports and imports the comma separated variable (CSV) format, allowing configuration using third-party tools, such as spread sheets or databases.

The KAGUI presents alarm data to an operator and allows an operator to respond to the occurrence of an alarm state by selecting the appropriate keys. However, the operator will not always display a key pad annunciator as a topmost window on the monitor. It is critical, however, that alarm data be presented and responded to in a timely manner. Accordingly, the invention incorporates several features to enhance operator awareness of alarms. One feature is a compact visual representation of the key pad annunciator, or annunciators, for which the KAGUI is configured. The compact visual representation, referred to herein as a panel manager, is illustrated in FIG. 6.

Figure 6:
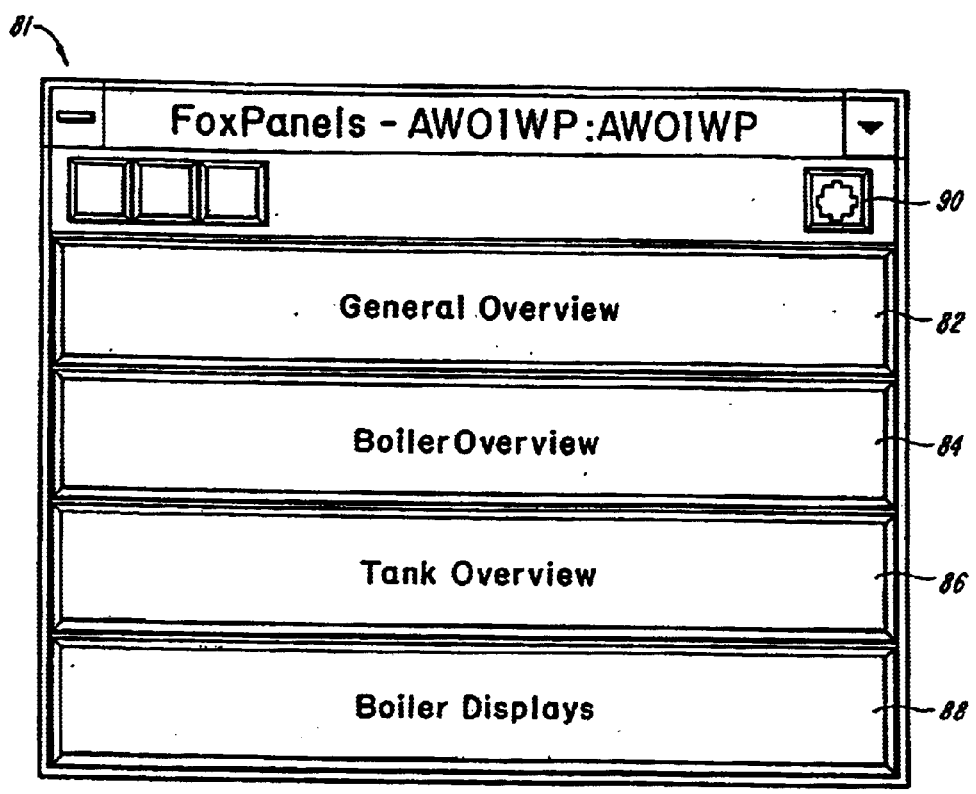
FIG. 6 shows a typical panel manager display component of the keypad annunciator graphical user interface.

Panel manager 81 in FIG. 6 includes graphical elements, or buttons, for each keypad annunciator to which it is responsive. Panel manager thus represents four keypad annunciators and has four buttons: General overview button 82, boiler overview button 84, tank overview button 86 and boiler display button 88. Occurrence of an alarm state associated with a key of a given keypad annunciator causes the appropriate button, responsive to that keypad annunciator, to illuminate. Selecting the illuminated button with the pointing device causes the keypad annunciator to appear as a high priority window on the monitor. The user then deals as necessary with the alarm.

Figure 7:
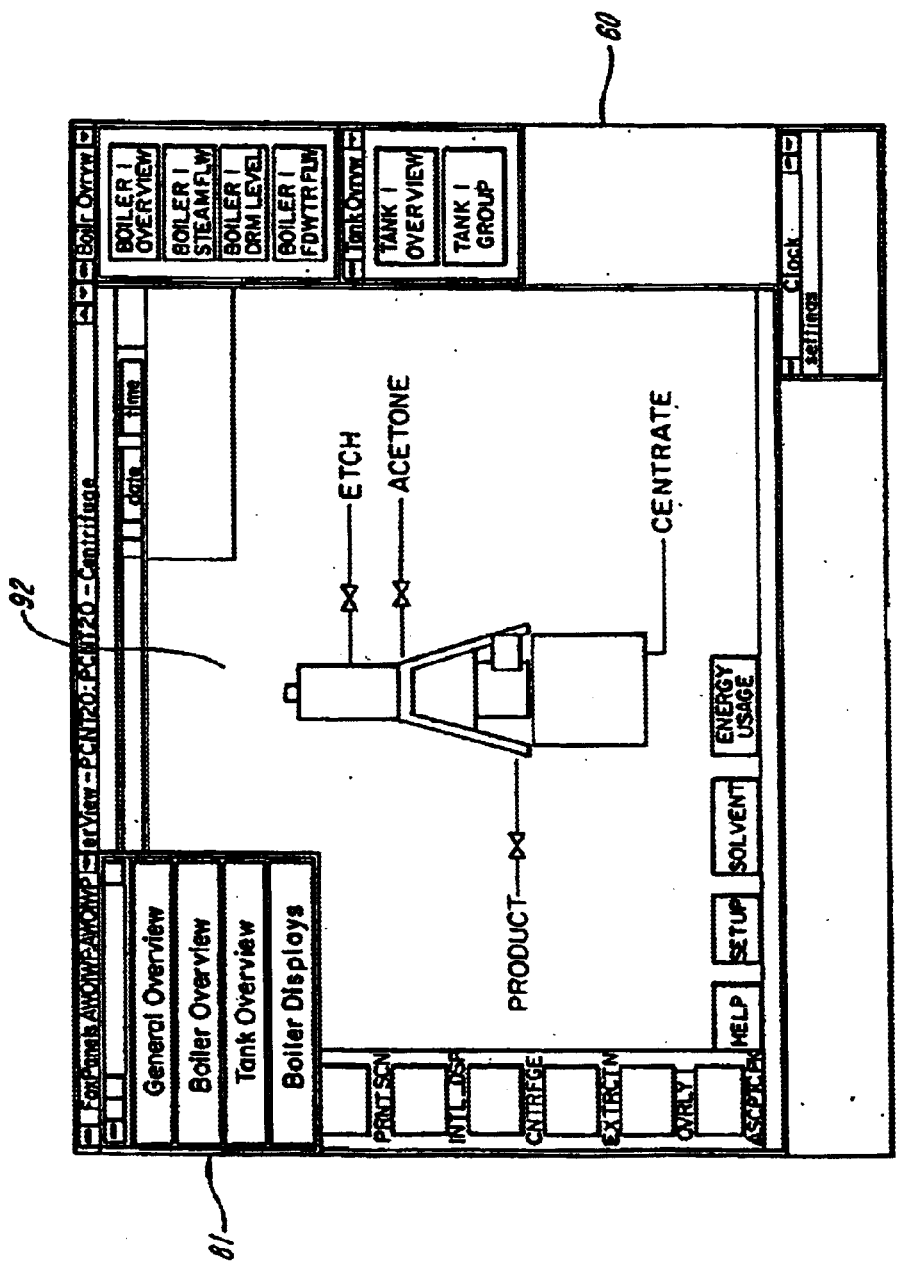
FIG. 7 illustrates the panel manager displayed alongside a process graphic on a workstation display monitor.

The operator may configure panel manager 81. Typically a solid button color indicates no alarm, a second blinking color indicates an alarm, and a second, solid color indicates an acknowledged alarm The panel manager 81 is typically larger than an icon but smaller than a keypad annunciator, however its exact size relative to a keypad annunciator depends on the number of keypad annunciators that the panel manager 81 manages. The panel manager is configurable to float on top of the desk top as a high priority window or appear on the display the occurrence of an alarm state associated with keys of selected keypad annunciators. FIG. 7 illustrates a process graphic for a centrifuge 92 over which the panel manager 81 floats.

Figure 8A:
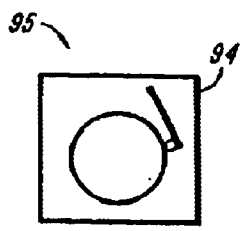
FIGS. 8A and 8B show a dynamic icon for displaying a minimized panel manager component of a keypad annunciator graphical user interface.
Figure 8B:
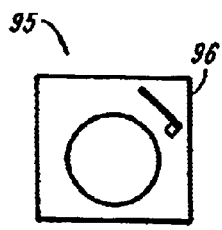

Should the operator desire to fully minimize the KAGUI, the invention provides a dynamic icon 95. The icon can be configured to float on the desk top as a display with a priority higher than most, or all, windows, or to display upon occurrence of an alarm state. The icon 95 indicates alarms by dynamically changing its appearance. Dynamic icon 95 is illustrated in FIGS. 8A and 8B. Upon occurrence of selected alarm state, the icon appears as continually changing from icon state 94 to icon state 96; otherwise, the icon is static, and can appear as in FIG. 5A or as in FIG. 5B.

The invention thus provides an operator with a wide range of display options.

Figure 9:
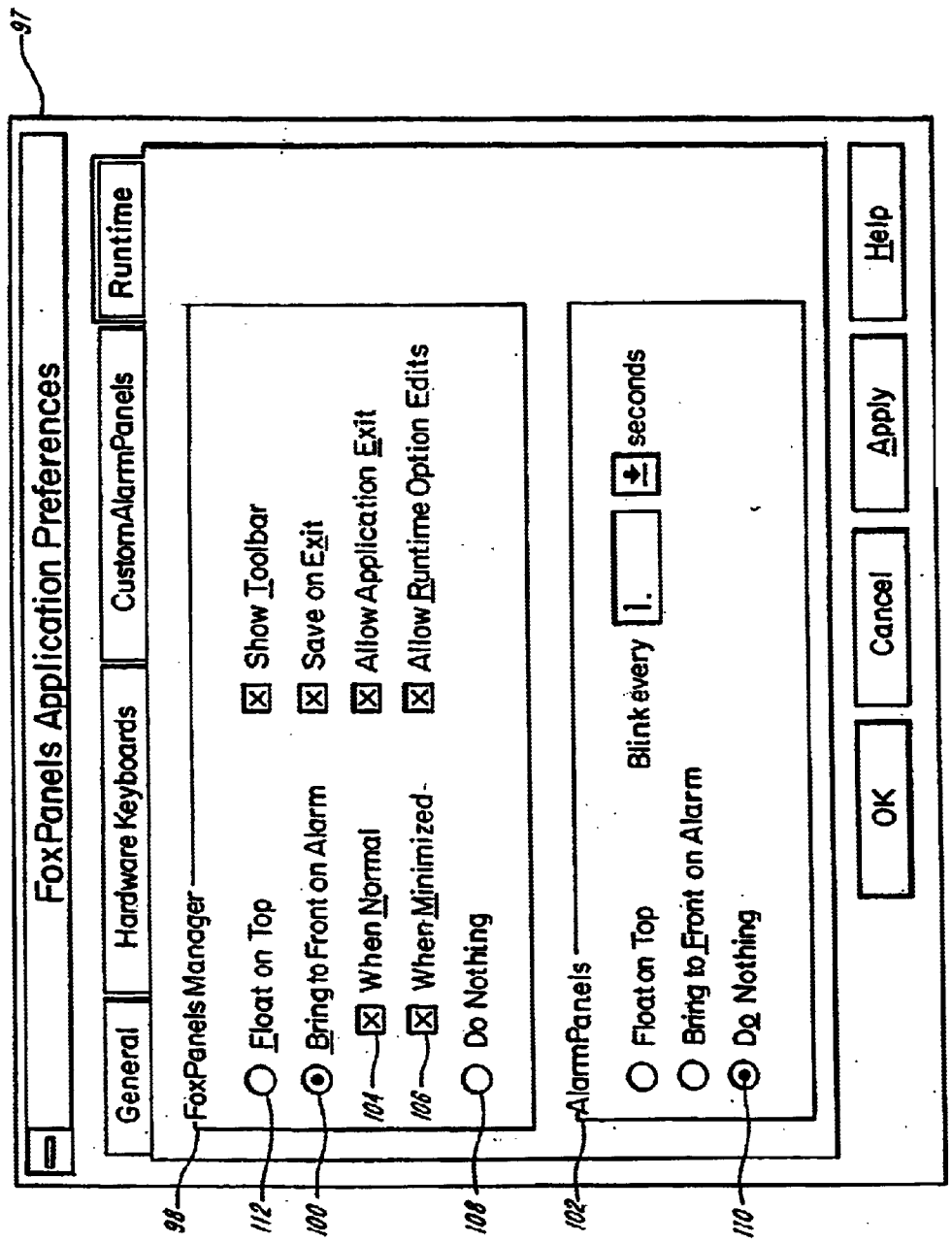
FIG. 9 illustrates a property page for configuring the major display options of the keypad annunciator graphical user interface.

FIG. 9 illustrates dialog 97 for selecting run time display options of the KAGUI. Option boxes 98 and 102 are for selection of display options for the panel manager and keypad annunciators, respectively. In panel manager option box 98, option button 100 and check boxes 104 and 106 are selected. Upon the occurrence of an alarm state, the panel manager, if obscured by other windows, is brought to the front of the display. If the panel manager 81 is minimized, the dynamic icon is brought to the front of the display. In option box 102, option button 1 10 is selected, therefore, the keyboard annunciators do not float on the display as high priority windows and do not appear upon occurrence of an alarm state.

Note that the operator may choose to eliminate all visual cues to the occurrence of an alarm by choosing option button 108 in panel manager option box 98 and option button 110 in option box 102. In this case an operator is relying on the horn or other configured audible stimulus to warn him of an occurrence of an alarm. Note that selecting option button 112, "float on top," in panel manager box 98 and option box 110, "do nothing," in option box 102, float the panel manager on the top of the display, and minimizing the panel manager 81 brings the icon 94 up as a floating display.

Figure 10:
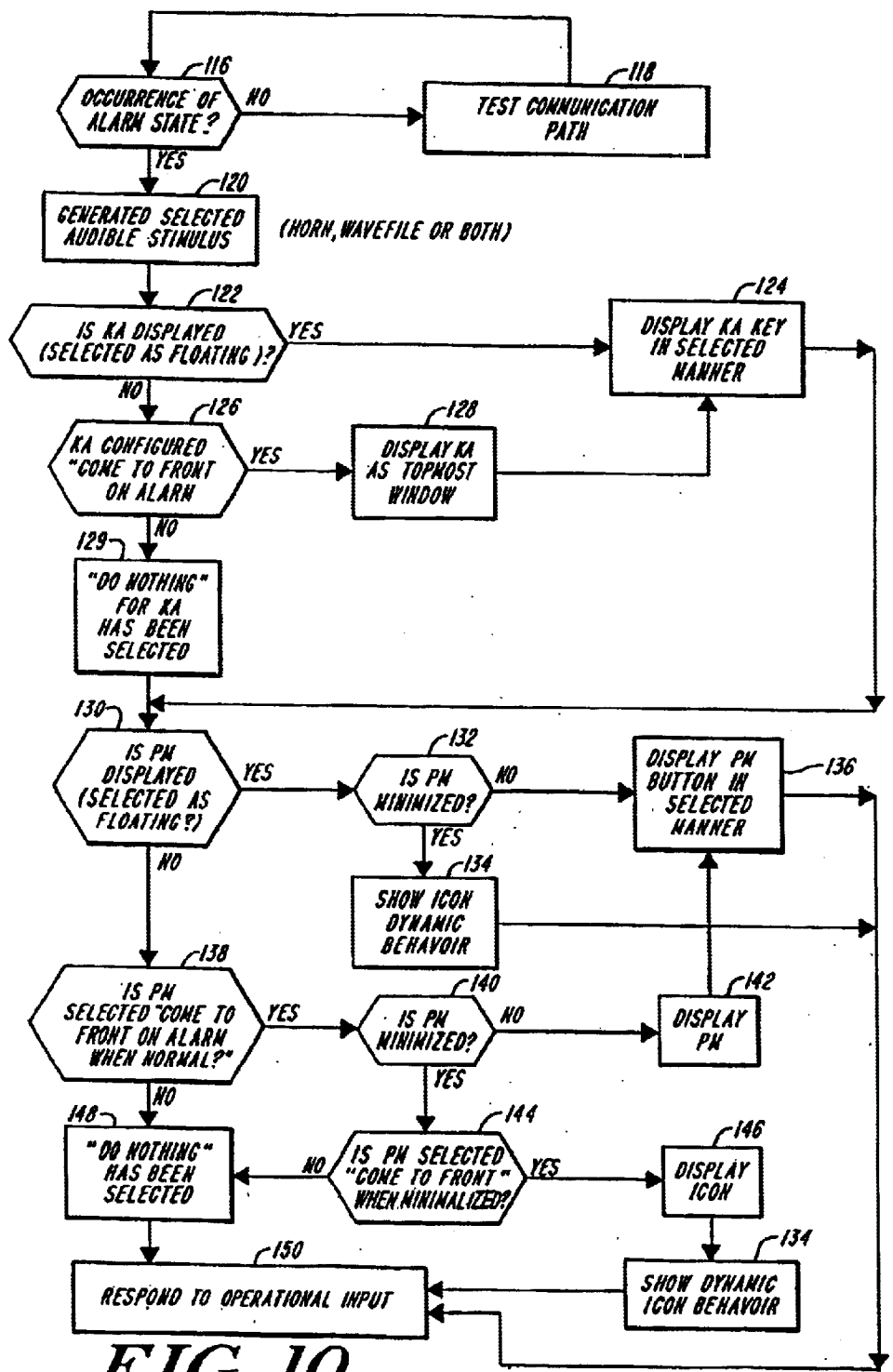
FIG. 10 is a flow chart illustrating run-time decisions made by the keypad annunciator graphical user interface for displaying alarm state information.

FIG. 10 illustrates a flow chart for the runtime behavior of the KAGUI in alerting the operator to the occurrence of an alarm state, based on options selected in dialog 97. Normally the KAGUI continually tests for the occurrence of alarm states, as in 116. If no alarm states are occurring, the KAGUI periodically tests the communication path, as indicated by box 118. Box 118 will be elaborated on subsequently. Upon occurrence of an alarm state, the KAGUI generates the audible stimulus selected for that alarm state, as indicated in box 120. Although not recommended, an operator can eliminate all visual and audible stimuli. Typically the operator will be alerted to the occurrence of an alarm state by both audible and visual stimuli.

From box 120 the KAGUI proceeds to decision box 122, and determines whether the keypad annunciator containing the key in an alarm state is displayed. If the keypad annunciator is displayed, the key is illuminated in the selected manner. If the keypad annunciator is not displayed, the KAGUI proceeds to decision box 126. If the keypad annunciator is configured to come to the front of the display as a high priority window on alarm, the keyboard annunciator is displayed, as indicated by box 128, and the key is displayed in the selected manner as in box 124. If the key pad annunciator is not configured to appear on alarm, the KAGUI proceeds from decision box 126 to box 129, and as indicated by that box, option box 110 in key pad annunciator option box 102 of FIG. 9 has selected, and the KAGUI "does nothing" with the keypad annunciator displays. Both box 129, "do nothing" and box 124 "display key pad annunciator in selected manner" bring the KAGUI to decision box 130.

If the panel manager 81 is selected as floating, the KAGUI proceeds along the "yes" branch to decision box 132. From box 132, if the panel manager is minimized, the KAGUI proceeds from box 132 to box 134 and the icon dynamic behavior is shown. If the panel manager 81 is not minimized the KAGUI proceeds from box 132 to box 136 and the appropriate button, for example, button 84 of panel manager 81 is displayed in the selected manner. Both box 134, "show dynamic icon behavior," and box 136, "display the panel manager button in selected manner," lead the KAGUI to box 150, where the KAGUI awaits operator input.

Returning to decision box 130, if panel manager 81 is not selected as floating, the KAGUI proceeds instead along the 'no' branch to decision box 138. If the panel manager 81 is configured in dialog 97 to appear, the KAGUI proceeds along the "yes" path from box 138 to decision box 140. From 140, if the panel manager is not minimized, the KAGUI proceeds to box 142, displays the panel manager and then proceeds to box 136 and displays the appropriate button of panel manager 81 and then proceeds to box 150, "respond to operator input." If box 140 decides that the panel manager is minimized, the KAGUI proceeds to decision box 144, and determines whether the panel manager is selected to appear when minimized, that is, it determines whether option button 100 on property page 97 is selected and whether check box 106 is checked. If the answer is yes to both, the KAGUI proceeds to box 146, "display icon," then to box 134, "show icon dynamic behavior," and then to 150, "respond to operator input." Otherwise, following the "no" branch decision box 138, the KAGUI proceeds to box 148, and then to box 150, "respond to operator input" . Note that the operator may configure the display, such that no visual stimuli are produced on an occurrence of an alarm.

Described in FIG. 10 is a particular flow chart for a KAGUI to follow in producing visual stimuli. It will be apparent to those of ordinary skill in the art that sequences of steps and decisions in FIG. 10 are only examples; there can be variations to those steps and sequences illustrated in FIG. 10, including, for example, following more or less than all the steps of FIG. 10, modifying one or more of the steps, or changing the order of some or all steps, without departing from the spirit or scope of the invention. These variations are therefore considered a part of the present invention.

The KAGUI alerts the operator to the occurrence of selected alarm states of the process control system and enhances the operator's ability to respond. However, for the KAGUI to be effective it must accurately represent the alarm state of the process control system. Individual computers or processors, and processes running on computers, communicate by way of IPC paths. Referring to FIG. 2, the alarm alert task 30 communicates with server task 34 over IPC path 32, and server task 34 communicates with the client task 38 over IPC path 36. The alarm alert task 30 maintains a state table of all alarm data generated by the process control system, and typically is a computational process running work station 12. If any entry in the state table changes, for example, because of an alarm being generated, the alarm alert task communicates this change in alarm state over IPC path 32 to server task 34. Server task 34 in turn routes this change in alarm state to client task 38 by communicating over IPC path 36. The alarm state is then displayable by the KAGUI.

The goal of the process operator is a healthy running industrial process in which alarm states are not often generated. In practice, IPC paths 32 and 36 may not be used regularly, and therefore are not frequently tested. However, it is imperative that when a change in alarm state does occur, the IPC paths 32 and 36 are capable of transmitting this change in alarm state.

Several types of IPC paths, including pipes and sockets, are well known to those skilled in the art. In addition, a given process control system may use a proprietary type of IPC path. IPC paths can further be categorized as connectionless and connection-oriented. In connectionless IPC path, the sending of data in one direction on a path, for example, from alarm alert task 30 to server task 34 over IPC path 32, causes an acknowledgment to be sent from server task 34 back to alarm alert task 30. In response to that first acknowledgment a second acknowledgment is sent from alarm alert task 30 to back to server task 34. The acknowledgment, however, does not usually contain information that identifies the data packet being acknowledged. A connection oriented IPC path is a little more sophisticated. If, for example, server task 34 communicates with client task 38 over a connection oriented IPC path 36, each data packet traveling from server task 34 to client task 38 generates an acknowledgment packet from client task 38 to server task 34. The acknowledgment packet contains a data sequence that identifies which data packet is being acknowledged. If server task were to send data and no acknowledgment is received by the server task within a specified time, the server task automatically resends the data packet over the IPC path 36.

Connectionless IPC paths are often suitable when two processes that are communicating are both running on the same machine or computer. The more sophisticated connection oriented path is used when two processes running on different machines communicate over a network connection, as network connections may not be as reliable as interprocess communication on the same processor.

The preferred embodiment of the invention employs connection oriented IPC paths and include further features to maximize the probability that the alarm state information displayable by the KAGUI is accurate and to inform an operator of the status of IPC paths 32 and 36 used to communicate alarm state information.

According to this feature, the invention maintains IPC paths used for the transmission of alarm data by continually sending verification messages over the IPC paths. The content of these verification signals is typically irrelevant; their purpose is to generate acknowledgment signals from the receiver of the verification message. The entities at each end of a given IPC path both transmit verification signals to verify the continued existence of the path, and should the path fail to function, i.e., should a failure to receive acknowledgment signals be detected, they cooperate in reestablishing an IPC path. For example, server task 34 in FIG. 2 constantly sends verification signals over IPC path 36 to receive a constant stream of acknowledgment signals from client task 38. Client task 38 sends a constant stream of verification signals over path 36 to receive a steady stream of acknowledgment signals from server task 34. If the path 36 fails, the server task 34, upon detecting a failure to receive acknowledgment signal, usually by waiting for a selected period of time after sending verification messages, goes into listening mode. The client task 38, similarly detecting a failure of the communication path 36, goes into an attach mode. Together, the server 34 and client 38 re-establish a new communication path 36.

The operator is alerted to the status of communication path 36 by a graphical element that is part of panel manager 81. Referring to FIG. 6, graphical element 90, in the illustrated embodiment a tool button, simulates an LED. Toolbutton 90 blinks green as long as all IPC path being verified are open and functioning, that is, as long as regular acknowledgment signals are received. Should a failure of an IPC path be detected, the tool button 90 blinks red to alert an operator that the alarm state information presented by the KAGUI might not be accurate.

Figure 11:
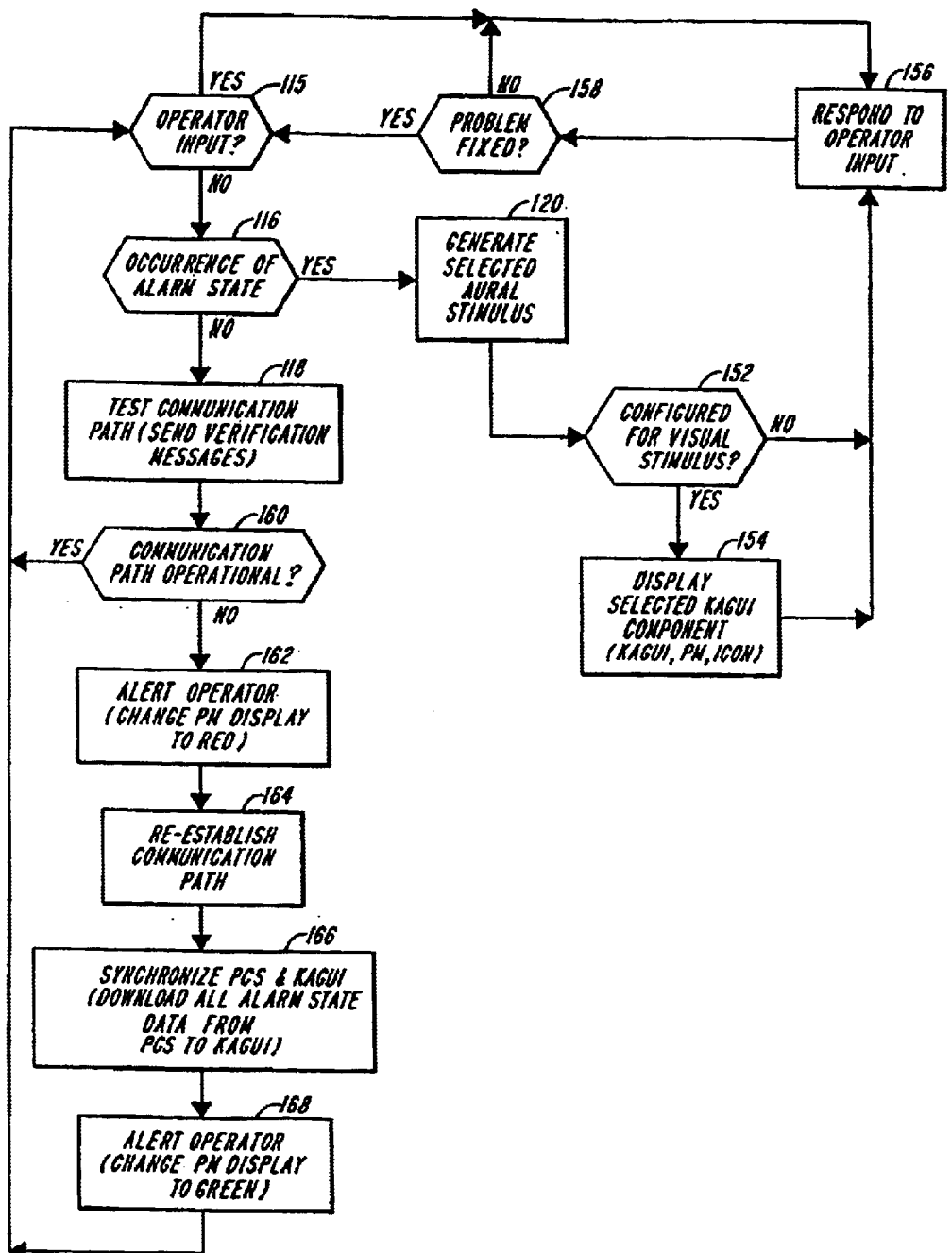
FIG. 11 is another flow chart of the run time behavior of the keypad annunciator graphical user interface, illustrating the maintenance of interprocess communication paths used for transmission of alarm data, including automatic synchronization of process control system alarm data and alarm state information presented by a keypad annunciator graphical user interface.

The invention also includes an automatic synchronization procedure for maximizing the probability that the KAGUI displays the proper alarm state condition. This synchronization technique is discussed in conjunction with FIG. 11, which also illustrates the run time behavior of the KAGUI. Referring to FIG. 11, the KAGUI continually checks for the occurrence of alarm states and awaits operator input, and indicated by boxes 115 and 116. Should an alarm state be generated, the KAGUI proceeds to box 120 and generates the selected audible stimulus. Proceeding to decision box 152, if the KAGUI is configured for visual stimulus, the KAGUI displays the selected visual stimulus as indicated by box 154. The KAGUI then responds to operator input as indicated by box 156. If the KAGUI is not configured for the display of visual stimuli, it proceeds directly from box 152 to box 156. In either case, the KAGUI responds to operator input until the problem is fixed, as illustrated by decision box 158.

If the test for the occurrence of an alarm state in decision box 116 indicates that no alarms states have changed, the KAGUI automatically proceeds to box 118 and tests communication paths. Verification signals are continually sent over important IPC paths. Should all acknowledgments be received, as indicated by the yes branch of decision box 160, the KAGUI simply returns to its normal state, as in decision boxes 115 and 116, of responding to operator input and continually testing for the occurrence of an alarm state. Should a failure to receive acknowledgment messages be detected by any sender, the KAGUI proceeds to box 162 and alerts the operator, typically by changing toolbutton 96 from green to red. After alerting the operator, the KAGUI re-establishes the pipe or socket or other proprietary communication path between, for example, server task 34 and client task 38, as indicated by box 164. Once the IPC path is re-established, the KAGUI resynchronizes the alarm data presented by the KAGUI with current alarm data by downloading, as indicated in box 166, all alarm state data from alarm task 30 to client task 38, which is associated with the KAGUI. The KAGUI alarm data is thus refreshed. Should server task 34 and client task initially fail to establish a communication path, they continue to try until a path is established. The KAGUI then proceeds to box 168, and the operator is informed, by panel manager toolbutton changing back to a simulated green LED, that IPC communication paths are now operational. The KAGUI then returns to its normal state of responding to operator input and continually testing for an alarm state, as indicated by boxes 115 and 116. Note that synchronization need not be automatic; the operator could be relied upon to manually download data.

It is expected that one of ordinary skill in the relevant arts, possessed of the teachings herein, can create a KAGUI for use with a process control system using an object oriented approach in a computer language such as C++. Implementation of the KAGUI described herein relied heavily on published class libraries such as the Microsoft Foundation Class library. However, the visual basic computer language should also allow design of a key pad annunciator graphical user interface quite similar to that disclosed herein.

The invention thus provides a keypad annunciator graphical user interface (KAGUI) for presenting an interactive keypad annunciator on a monitor display. Alarm state data are presented, and an operator can respond by selecting elements of the keypad display, such as a key, with a pointing and selecting input device. Keypad annunciators can be readily configured to allow efficient and effective management of the process control system. The KAGUI includes a panel manager and a dynamic icon to enhance operator awareness, in a multi-window display environment, of alarms. Many display options for keypad annunciators, the panel manager, and the icon are available. The KAGUI synchronizes alarm data presented by the KAGUI with process control system alarm data and informs the operator of the status of interprocess communication paths.

It will thus be seen that the invention efficiently obtains objects set forth above among those made apparent from the preceding description. Because certain changes may be made in the above constructions without departing from the scope of the invention, it is intended that all matter contained in the above description and shown in the accompanied drawings be interpreted as illustrative and not an limiting sense.

It is also to be understood that the following claims are intended to cover generic and specific features of the invention described herein and all statements of the scope of the invention which as a matter of language might be said to fall therebetween.

Having described the invention, what is claimed as new and secured by Letters Patent is:

1. Apparatus for maintaining synchronization between process-control data representative of a process control system and presentation data responsive to the process-control data, said apparatus comprising
transmitting means for transmitting, on a communication path between a computational task of the process control system and a keypad annunciator graphical user interface of the process control system, a succession of verification signals,
receiving means for receiving acknowledgment signals in response to successful transmission of the succession of verification signals, said receiving means verifying the continued existence of the communication path,
detection means for detecting a failure to receive the acknowledgment signals, and
re-establishment means for re-establishing the communication path in response to a failure to receive acknowledgement signals.

2. Apparatus according to claim 1, further including
refresh means for transmitting current alarm values of the process-control data from the computational task to the keypad annunciator graphical user interface to refresh the presentation data, said refresh means transmitting the current alarm values using the communication path.

3. A method of maintaining synchronization between process-control data representative of a process control system and presentation data responsive to the process-control data, said method comprising
transmitting, on a communication path between a computational task of a process control system and a keypad annunciator graphical user interface of the process control system, a succession of verification signals,
receiving acknowledgment signals in response to successful transmission of the succession of verification signals for verifying the continued existence of the communication path, and
maintaining the communication path by;
detecting a failure to receive the acknowledgment signals, and
responding to a detected failure to receive the acknowledgment signals by re-establishing the communication path.

4. A method according to claim 3, further including refreshing the presentation data by transmitting, in response to the re-establishment of a communication path, current alarm values of the process-control data from the computational task to the keypad annunciator graphical user interface.

5. A method according to claim 4, further including
refraining, under selected conditions, from transmitting alarm values of said process-control data from the computational task to the keypad annunciator graphical user interfaces,
upon a change in an alarm value of the process-control data, transmitting the changed alarm value from the computational task to the keypad annunciator graphical user interface to update the presentation data, and,
in response to the re-establishment of a communication path, transmitting current alarm values of the process-control data from the computational task to the keypad annunciator graphical user interface to refresh the presentation data,
wherein said selected conditions exclude a change in an alarm value of the process-control data and a re-establishment of a communication path.

6. A method according to claim 3, further including providing a first indication at the keypad annunciator graphical user interface in response to verification of the continued existence of the communication path.

7. A method according to claim 6, further including changing the appearance of said first indication in response to a failure to verify the continued existence of the communication path.

8. A method according to claim 6, where providing a first indication further includes providing a first graphical element of a panel manager display of the keypad annunciator graphical user interface.

9. A method according to claim 8, further including changing the appearance of said first graphical element in response to a failure to verify the continued existence of the communication path.

10. A method according to claim 3, further including providing a second indication at the keypad annunciator graphical user interface in response to the detection of a failure to verify the continued existence of the communication path.

11. A method according to claim 10, where providing a second indication further includes providing a second graphical element of a panel manager display of a keypad annunciator graphical user interface.

12. A method for maintaining synchronization between generation of alarm data by a process control system and the presentation of the alarm data by a keypad annunciator graphical user interface, said method comprising:
   transmitting a succession of verification signals on a communication path used for the transmission of the alarm data,
   receiving acknowledgment signals in response to successful transmission of the succession of verification signals, thereby verifying the continued existence of the communication path,
   maintaining said communication path by detecting a failure to receive said acknowledgment signals, and, in response to a failure to receive acknowledgment signals, re-establishing the communication path, and
   transmitting current alarm data to the keypad annunciator graphical user interface using the re-established communication path.

13. A method according to claim 12, further including providing, at the keypad annunciator graphical user interface, a first indication in response to a verification of the existence of the communication path.

14. A method according to claim 13, further including changing said first indication in response to a failure to verify the existence of the communication path.

15. A method according to claim 13, further including providing, at the keypad annunciator graphical user interface, a second indication in response to a failure to verify the continued existence of the communication path.

16. A method according to claim 13, wherein providing a first indication further includes providing a first graphical element in a panel manager display of the keypad annunciator graphical user interface.

17. A method according to claim 16, further including changing said first graphical element in response to a failure to verify the continued existence of the communication path.

18. A method according to claim 12, further comprising selecting the communication path to be between a first computational process for maintaining a table of alarm data and a second computational process for routing alarm data to the keypad annunciator graphical user interface.

19. A method according to claim 12, further comprising selecting the communication path to be between a server process and a client process operative with the keypad annunciator graphical user interface.

\* \* \* \* \*